United States Patent
Kurata et al.

(10) Patent No.: US 7,771,783 B2
(45) Date of Patent: Aug. 10, 2010

(54) METHOD OF MANUFACTURING COLORED LENS

(75) Inventors: Shingo Kurata, Komaganeshi (JP); Mitsuhiro Toda, Minamiminowamua (JP); Naoki Uchida, Minowamachi (JP)

(73) Assignee: Seiko Epson Corporation, Tokyo (JP)

( * ) Notice: Subject to any disclaimer, the term of this patent is extended or adjusted under 35 U.S.C. 154(b) by 354 days.

(21) Appl. No.: 11/860,248

(22) Filed: Sep. 24, 2007

(65) Prior Publication Data

US 2008/0075848 A1   Mar. 27, 2008

(30) Foreign Application Priority Data

Sep. 25, 2006   (JP)   ............... 2006-258823

(51) Int. Cl.
*C03C 17/30*   (2006.01)
*B05D 5/06*   (2006.01)

(52) U.S. Cl. ................... 427/164; 427/162; 427/165; 427/169

(58) Field of Classification Search ............ 427/130
See application file for complete search history.

(56) References Cited

U.S. PATENT DOCUMENTS

| 3,971,872 A | 7/1976 | LeBoeuf | |
| 6,008,285 A * | 12/1999 | Kasemann et al. | 524/430 |
| 2006/0082902 A1 * | 4/2006 | Matsui | 359/722 |

FOREIGN PATENT DOCUMENTS

| GB | 2144345 | * | 8/1984 |
| GB | 2 144 345 A | | 3/1985 |
| JP | 11/310755 | * | 9/1999 |
| JP | 11-310755 A | | 11/1999 |
| JP | 2000-266905 A | | 9/2000 |
| JP | 2000-273773 A | | 10/2000 |
| JP | 2001-288406 A | | 10/2001 |
| JP | 2001-288412 A | | 10/2001 |
| JP | 2001-295185 A | | 10/2001 |
| JP | 2004-170500 A | | 6/2004 |

* cited by examiner

*Primary Examiner*—Michael Cleveland
*Assistant Examiner*—Lisha Jiang
(74) *Attorney, Agent, or Firm*—Sughrue Mion, PLLC

(57) ABSTRACT

A method of manufacturing a colored lens includes: applying a coating liquid for forming a dyeable hard coat layer over a lens substrate; firstly heating the lens substrate coated with the coating liquid after the coating step at a temperature of $T_1°$ C. for $t_1$ hours; dyeing the heated lens substrate by dipping it in a dyeing liquid after the first heating step; and secondly heating the lens substrate which is dyed after the dyeing step at a temperature of $T_2°$ C. for $t_2$ hours, wherein the following expression is satisfied when the product of the temperature $T_1$ and the time $t_1$ is a first management value Q1 and the product of the temperature $T_2$ and the time $t_2$ is a second management value Q2:

$0.2 < Q1/(Q1+Q2) \leq 0.5$.

7 Claims, 3 Drawing Sheets

| | FIRST HEATING STEP | | SECOND HEATING STEP | | DYE-ABILITY t3 | DYEING WORK-ABILITY | YELLOW DEGREE | UNEVEN COLORING | WEAR-RESISTANCE | CLOSE-ADHESION | | |
|---|---|---|---|---|---|---|---|---|---|---|---|---|
| | TEMPER-ATURE T1 | TIME t1 | TEMPER-ATURE T2 | TIME t2 | | | | | | SUNSHINE 120H | CONSTANT-TEMPERATURE AND HUMIDITY 7 DAYS | HOT WATER 90°C × 1.5 H |
| EXAMPLE 1 | 125°C | 0.50 H | 125°C | 1.50 H | 3 min | ○ | ○ | ○ | ○ | 8 | 8 | 8 |
| EXAMPLE 2 | 125°C | 0.50 H | 125°C | 0.50 H | 3 min | ○ | ○ | ○ | ○ | 8 | 8 | 8 |
| EXAMPLE 3 | 125°C | 1.00 H | 125°C | 1.00 H | 6 min | ○ | ○ | ○ | ○ | 8 | 8 | 8 |
| COMPARATIVE EXAMPLE 1 | 125°C | 1.00 H | 80°C | 0.50 H | 6 min | × | ○ | × | — | — | — | — |
| COMPARATIVE EXAMPLE 2 | 80°C | 0.50 H | 125°C | 1.50 H | 1 min | × | ○ | ○ | — | — | — | — |
| COMPARATIVE EXAMPLE 3 | 125°C | 0.25 H | 125°C | 1.75 H | 1 min | ○ | ○ | ○ | — | — | — | — |
| COMPARATIVE EXAMPLE 4 | 125°C | 2.00 H | 125°C | 1.00 H | 10 min | ○ | △ | ○ | ○ | 8 | 8 | 8 |
| COMPARATIVE EXAMPLE 5 | 125°C | 3.00 H | 125°C | 1.00 H | 12 min | ○ | × | ○ | ○ | 8 | 8 | 8 |
| COMPARATIVE EXAMPLE 6 | 125°C | 6.00 H | 125°C | 1.00 H | 15 min | ○ | × | ○ | — | — | — | — |
| COMPARATIVE EXAMPLE 7 | 150°C | 0.25 H | 125°C | 2.00 H | 3 min | ○ | ○ | ○ | ○ | 8 | 8 | 8 |
| COMPARATIVE EXAMPLE 8 | 125°C | 2.00 H | 120°C | 1.00 H | 10 min | ○ | × | ○ | — | — | — | — |
| COMPARATIVE EXAMPLE 9 | 125°C | 0.25 H | 150°C | 2.00 H | 1 min | ○ | ○ | ○ | — | — | — | — |
| COMPARATIVE EXAMPLE 10 | 125°C | 0.25 H | 80°C | 0.25 H | 6 min | × | ○ | × | — | — | — | — |

FIG. 2

| | AMOUNT OF HEAT FOR FIRST HEATING STEP (°C·H) | AMOUNT OF HEAT FOR SECOND HEATING STEP (°C·H) | TOTAL AMOUNT OF HEAT (°C·H) | HEAT DISTRIBUTION | TOTAL LEAD TIME | COMPREHENSIVE EVALUATION |
|---|---|---|---|---|---|---|
| | $Q_1 = T_1 * t_1$ | $Q_2 = T_2 * t_2$ | $Q_1 + Q_2$ | $Q_1/(Q_1+Q_2)$ | $t_1+t_2+t_3$ (min) | |
| EXAMPLE 1 | 62.5 | 187.5 | 250.0 | 0.3 | 123 | ○ |
| EXAMPLE 2 | 62.5 | 62.5 | 125.0 | 0.5 | 63 | ○ |
| EXAMPLE 3 | 125.0 | 125.0 | 250.0 | 0.5 | 126 | ○ |
| COMPARATIVE EXAMPLE 1 | 125.0 | 40.0 | 165.0 | 0.8 | 96 | × |
| COMPARATIVE EXAMPLE 2 | 40.0 | 187.5 | 227.5 | 0.2 | 121 | × |
| COMPARATIVE EXAMPLE 3 | 31.3 | 218.8 | 250.0 | 0.1 | 121 | × |
| COMPARATIVE EXAMPLE 4 | 250.0 | 125.0 | 375.0 | 0.7 | 190 | × |
| COMPARATIVE EXAMPLE 5 | 375.0 | 125.0 | 500.0 | 0.8 | 252 | × |
| COMPARATIVE EXAMPLE 6 | 750.0 | 125.0 | 875.0 | 0.9 | 435 | × |
| COMPARATIVE EXAMPLE 7 | 37.5 | 250.0 | 287.5 | 0.1 | 138 | × |
| COMPARATIVE EXAMPLE 8 | 250.0 | 120.0 | 370.0 | 0.7 | 190 | × |
| COMPARATIVE EXAMPLE 9 | 31.3 | 300.0 | 331.3 | 0.1 | 138 | × |
| COMPARATIVE EXAMPLE 10 | 31.3 | 20.0 | 51.3 | 0.6 | 36 | × |

FIG. 3

METHOD OF MANUFACTURING COLORED LENS

CROSS-REFERENCE TO RELATED APPLICATIONS

The present application claims foreign priority from Japanese Patent Application 2006-258823 filed Sep. 25, 2006. The entire disclosure of JPA 2006-258823 is incorporated herein.

BACKGROUND

1. Technical Field

The present invention relates to a method of manufacturing a colored lens of plastic or glass, which is used for glasses and so on.

2. Related Art

Instead of dyeing a plastic lens or a glass lens constituting a substrate, it is known to dye a functional layer of a colored lens, for example, a hard coat layer which is stacked on a substrate. Colored lenses are generally used as a lens for vision correction or a spectacle lens such as sunglasses and so on. JP-A-11-310755 discloses a method including the steps of applying a hard coat liquid onto the convex surface of a spectacle lens, curing the liquid by heating at a temperature of 135° C. for 0.5 hours, applying a hard coat liquid onto the concave surface of the spectacle lens, curing the liquid by heating at a temperature of 135° C. for 2.5 hours, and dipping the lens having a hard coat layer thereon in a dyeing liquid to be dyed.

Reduction in dyeing time and total manufacturing time is an important goal in manufacturing a colored lens.

In known methods of manufacturing a colored lens, a coating liquid for forming a dyeable hard coat layer is applied onto a lens substrate, a hard coat layer is heated so as to be completely cured (in a hardened state with burning), and then the lens substrate having the hard coat layer formed thereon is dyed by a dip dyeing method. As a result of extensive and intensive studies for dyed lenses, it has been determined that it is desirable to perform an annealing process for about one hour after a dyeing process in order to prevent uneven coloring from occurring and to fix a color. Then it is desirable to form an anti-reflection layer and the like if necessary. However, the annealing process after the dyeing process increases total manufacturing time.

SUMMARY

An advantage of some aspects of the invention is that it provides a method of manufacturing a colored lens, in which a coating liquid for forming a dyeable hard coat layer is applied onto a lens substrate, a hard coat layer is firstly heated to be semi-cured, the lens substrate having the semi-cured hard coat layer is dipped and dyed, and then is secondly heated so as to fix a dye to the hard coat layer, to eliminate distortion occurring at the time of dyeing, and to completely cure the hard coat layer.

As an aspect of the invention, there is provided a method of manufacturing a colored lens, the method including applying a coating liquid for forming a dyeable hard coat layer onto a lens substrate, or indirectly onto the lens substrate by interposing another layer therebetween. For the sake of brevity, both the idea of applying the coating liquid directly on the lens substrate, or indirectly by way of an interposed layer, shall be referred to more simply as applying the coating liquid "over" the lens substrate. Once coated, the lens substrate may be thought of as a coated substrate, whether or not there is any interposed layer. Then, firstly heating the lens substrate coated with the coating liquid at a temperature of $T_1°$ C. for $t_1$ hours, dyeing the heated lens substrate by dipping it in a dyeing liquid (dyeing the semi-cured hard coat layer formed on the lens substrate by dipping it in a dyeing liquid), and secondly heating the dyed lens substrate (the lens substrate on which the dyed, semi-cured hard coat layer is formed) at a temperature of $T_2°$ C. for $t_2$ hours. Here, when the product of the temperature $T_1$ and the time $t_1$ is a first management value Q1, the product of the temperature $T_2$ and the time $t_2$ is a second management value Q2, the relationship between the first management value Q1 and (Q1+Q2) satisfies the following Expression 1:

$$0.2 < Q1/(Q1+Q2) \leq 0.5 \qquad \text{Expression 1.}$$

The management values Q1 and Q2 correspond to the amount of heat applied to the lens substrate in the first and second heating steps, respectively. Accordingly, (Q1+Q2) corresponds to the amount of heat that contributes to curing the hard coat layer. Expression 1 described above represents that the hard coat layer is not completely cured in the first heating step before the dyeing step.

By adjusting the first management value Q1 in the first heating step to 50% or less of (Q1+Q2) corresponding to the total amount of heat, the hard coat layer is semi-cured (the hard coat layer is not completely cured but is dried to such an extent that it can be handled by hand). When the semi-cured hard coat layer is dyed, the time for dyeing is reduced in comparison with the case that the completely-cured hard coat layer is dyed. Accordingly, excellent dyeability can be achieved.

In the second heating step, the semi-cured hard coat layer is completely cured by applying the remaining heat used for curing the hard coat layer (this remaining amount of heat for fully curing the hard coat layer may be referred to as the "residual" heat). Moreover, in the second heating step, the dye is fixed to the hard coat layer, and in the subsequent steps, the penetrated dye (color) is not removed. Even when the semi-cured hard coat layer is completely cured in the second heating step, it is possible to provide products having no problems in durability such as wear-resistance and close-adhesion.

As shown in Expression 1, when the ratio Q1/(Q1+Q2) is 0.2 or less, the first management value Q1 is too small, and scratches are formed at the time of dyeing. On the other hand, when the ratio Q1/(Q1+Q2) is larger than 0.5, the first management value Q1 is too large, and there is no significant reduction in dyeing time.

Accordingly, in the method of manufacturing a colored lens according to an aspect of the invention, by applying heat in an amount Q1 satisfying Expression 1 in the first heating step, it is possible to reduce the total time of the first heating step, and dye the semi-cured hard coat layer. Thus, dyeing efficiency is improved. Therefore, it is possible to increase dyeing speed, and reduce the total time for performing the dyeing step. Then, by applying the residual heat based on the second management value Q2 in the second heating step, it is possible to completely cure the semi-cured hard coat layer, as well as to fix the dye to the hard coat layer. Therefore, the time for manufacturing and dyeing the hard coat layer in addition to heating it after dyeing is prevented from increasing. In addition, since the dyeing step can be reduced, the total time for performing the steps of manufacturing, dyeing, and annealing the hard coat layer can be reduced.

In the method of manufacturing a colored lens according to an aspect of the invention, a disperse dye is preferably used in the dyeing step to suppress color unevenness. In the dyeing step, a lens is dipped in an aqueous dyeing solution. Next, the lens is lifted from a bath and is washed with water, dried, and then dyed by a dip dyeing method using a dye bath. The dye used at this time is not particularly limited, but it is preferred to use a dye having high fastness.

As the dye, it is possible to use a disperse dye exemplified by an anthraquinone-based dye, a quinophthalone-based dye, a nitrodiphenylamine dye, an azo-based dye or the like. Specific examples of the disperse dye can include benzene intermediates such as p-anisidine, aniline, p-aminoacetanilide, p-aminophenol, 1-chloro-2,4-dinitrobenzene, 2-chloro-4-nitroaniline, o-chloronitrobenzene, diphenylamine, m-nitroaniline, p-nitroaniline, N,N-bis(2-hydroxyethyl)aniline, 1-phenyl-3-methyl-5-pyrazolone, and phenol, toluene intermediates such as p-cresidine(6-methoxy-m-toluidine), m-cresol, p-cresol, m-toluidine, 2-nitro-p-toluidine, and p-nitrotoluene, naphthalene intermediates such as 1-naphthylamine and 2-naphthol, phthalic anhydride, anthraquinone intermediates such as 1-amino-4-bromoanthraquinone-2-sulfonic acid(bromamine acid), 1-anthraquinonesulfonic acid, 1,4-diaminoanthraquinone, 1,5-dichloroanthraquinone, 1,4-dihydroxyanthraquinone(quinizarin), 1,5-dihydroxyanthraquinone(anthrarufin), 1,2,4-trihydroxyanthraquinone (purpurin), and 2-methylanthraquinone. The disperse dye may be used alone, or in a combination of two or more kinds. Generally, the disperse dye is provided as a dye bath by being dispersed in water. As a solvent, an organic solvent such as methanol, ethanol, or benzyl alcohol may be used with the water.

Further, to the dye bath can be also added a surfactant as a dispersant for the dye. Examples of the surfactant can include anion surfactants such as alkylbenzene sulfonates, alkylnaphthalene sulfonates, alkylsulfosuccinates, aromatic sulfonic acid formalin condensates, and lauryl sulfates, and nonionic surfactants such as polyoxyethylalkyl ethers, alkylamine ethers, and polyoxyethylenesorbitan fatty acid esters. These surfactants are preferably used in the range of 5 to 200% by weight, based on the amount of dye to be used, according to a coloring density of a lens. In the dipping and dyeing treatment, a disperse dye and a surfactant are dispersed in water or in a mixture of water and an organic solvent to prepare a dye bath, a plastic lens is dipped in the dye bath, and then the plastic lens is dyed at a predetermined temperature for a predetermined amount of time. The dyeing temperature and the dyeing time varies according to a desired coloring density, but the temperature may be 95° C. or less and the dyeing time may be in the range of several minutes to about 30 minutes. The concentration of the dye in the dye bath is preferably in the range of 0.01 to 5% by weight.

In the method of manufacturing a colored lens according to an aspect of the invention, it is desirable that the temperature $T_1$ and the temperature $T_2$ satisfy the following Expressions 2 and 3:

$$100° C. < T_1 < 150° C. \qquad \text{Expression 2; and}$$

$$100° C. < T_2 < 150° C. \qquad \text{Expression 3.}$$

When the temperature $T_1$ is 100° C. or less, the hard coat layer is not cured enough, and uneven coloring occurs, and scratches are easily formed at the time of dyeing. On the other hand, in the case of a plastic lens, when the temperature $T_1$ is 150° C. or higher, a lens substrate is easily yellowed by heat.

Similarly, when the temperature $T_2$ is 100° C. or less, uneven coloring occurs and scratches are easily formed at the time of dyeing. On the other hand, the temperature $T_2$ is 150° C. or larger, the lens substrate is easily yellowed by heat.

In addition, in the method of manufacturing a colored lens according to an aspect of the invention, it is desirable that the sum of the time $t_1$ and the time $t_2$ satisfies the following Expression 4:

$$1 \text{ hour} \leq (t_1+t_2) \leq 3 \text{ hours} \qquad \text{Expression 4.}$$

When $t_1+t_2$ is shorter than 1 hour, the curing of the hard coat layer is not satisfactory, and the evaluated wear-resistance thereof is thereby lowered. On the other hand, in the case of a plastic lens, when $t_1+t_2$ is longer than 3 hours, a lens substrate is easily yellowed by heat. In addition, it becomes difficult to effectively reduce the total time for manufacturing a colored lens.

In the method of manufacturing a colored lens according to an aspect of the invention, a hard coat layer including fine metal-oxide particles, a silicon compound, and a polyfunctional epoxy compound as main components is exemplified as the dyeable hard coat layer.

As the fine metal-oxide particles, an antimony oxide coated titanium oxide-containing complex oxide sol dispersed in methanol; or fine particles or composite fine particles including one or more kinds of metal oxide selected from Si, Al, Sn, Sb, Ta, Ce, La, Fe, Zn, W, Zr, In and Ti can be used. The fine metal-oxide particles may be fine particles of which the outermost surfaces are treated with an organosilicon compound for modification, and can be exemplified by fine particles in the form of a mixture, solid solution, or other composite. Titanium oxide may be either amorphous, or may be an anatase type, rutile type, brookite type, or perovskite type titanium compound. These are colloidally dispersed in a dispersion medium such as water, alcohols, and other organic solvents. In addition, fine composite oxide particles may be used after treating their surfaces with an organosilicon compound or an amine-based compound. Examples of the organosilicon compound that can be used for this treatment include a monofunctional silane, a difunctional silane, a trifunctional silane, a tetrafunctional silane, and the like. The treatment may be carried out without hydrolyzing hydrolyzable groups, or after hydrolyzing the same. Further, the state of the fine particles after the treatment is preferably such that the hydrolyzable groups have been reacted with —OH groups on the fine particles. However, even if some unreacted —OH groups are remaining, the stability is not affected at all. Examples of the amine-based compound include ammonium, alkylamines such as ethylamine, triethylamine, isopropylamine, and n-propylamine, aralkylamines such as benzylamine, alicyclicamines such as piperidine, alkanolamines such as monoethanolamine and triethanolamine, and the like. The amount of the organosilicon compound or the amine-based compound to be added is preferably about 1 to 15% of the weight of the fine particles. It is preferable that the particle diameter of any of the above-described fine particles be in the range of approximately 1 to 300 nm.

It is preferable that a silicon compound is formed using a composition including a component that is an organosilicon compound represented by the following formula (A):

(where n is 0 or 1).

In the formula (A), $R^1$ is an organic group having a polymerizable reaction group or a hydrolyzable functional group. Specific examples of the polymerizable reaction group can include a vinyl group, an allyl group, an acryl group, an methacryl group, an epoxy group, a mercapto group, a cyano group, an amino group and the like. Specific examples of the hydrolyzable functional group can include an alkoxy group such as a methoxy group, an ethoxy group, and a methoxyethoxy group, a halogen group such as a chloro group and a bromo group, an acyloxy group and the like.

In the formula (A), $R^2$ is a hydrocarbon group having 1 to 6 carbon atom(s). Specific examples of the hydrocarbon group can include a methyl group, an ethyl group, a butyl group, a vinyl group, a phenyl group and the like. In addition, in the formula (A), $X^1$ is a hydrolyzable functional group. Specific examples of the hydrolyzable functional group can include an alkoxy group such as a methoxy group, an ethoxy group, and a methoxyethoxy group, a halogen group such as a chloro group and a bromo group, an acyloxy group and the like.

Specific examples of the organosilicon compound represented by the above formula (A) can include vinyltrialkoxysilanes, vinyltrichlorosilane, vinyltri(β-methoxy-ethoxy)silane, allyltrialkoxysilanes, acryloxypropyltrialkoxysilanes, methacryloxypropyltrialkoxysilanes, methacryloxypropyldialkoxymethylsilanes, γ-glycidoxypropyl-trialkoxysilanes, β-(3,4-epoxycyclohexyl)-ethyltrialkoxy-silanes, mercaptopropyltrialkoxysilanes, γ-aminopropyl-trialkoxysilanes, N-β(aminoethyl)-γ-aminopropyl-methyldialkoxysilanes, tetramethoxysilanes, γ-glycidoxypropyl-trimethoxysilanes, and the like. The compounds may be used in combination of two or more kinds. Further, it is more effective that the compounds are used after they are hydrolyzed.

Examples of the polyfunctional epoxy compound can include polyolefin epoxy resins synthesized by aperoxidation process, alicyclic epoxy resins such as polyglycidyl ester obtainable from cyclopentadiene oxide, cyclohexene oxide or hexahydrophthalic acid and epichlorohydrin, polyglycidyl ethers obtainable from polyhydric phenols such as bisphenol A, catechol and resorcinol, or polyhydric alcohols such as (poly)ethylene glycol, (poly)propylene glycol, neopentyl glycol, glycerin, trimethylol propane, pentaerythritol, diglycerol and sorbitol, and epichlorohydrin, epoxidized vegetable oils, epoxynovolaks obtainable from novolak-type phenol resins and epichlorohydrin, epoxy resins obtainable from phenolphthalein and epichlorohydrin, copolymers of glycidyl methacrylate and methyl methacrylate acrylic monomer or styrene, and epoxy acrylates obtainable by means of glycidyl-ring-opening reaction between the above epoxy compounds and monocarboxylic-acid-containing (meth) acrylic acid.

Specific examples of preferable polyfunctional epoxy compounds can include aliphatic epoxy compounds such as 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycoldiglycidyl ether, neopentyl glycol diglycidyl ether, diglycidyl ether of neopentyl glycol hydroxypivalic ester, trimethylolpropane diglycidyl ether, trimethylolpropane triglycidyl ether, glycerol diglycidyl ether, glycerol triglycidyl ether, diglycerol diglycidyl ether, diglycerol triglycidyl ether, diglycerol tetraglycidyl ether, pentaerythritol diglycidyl ether, pentaerythritol triglycidyl ether, pentaerythritol tetraglycidyl ether, dipentaerythritol tetraglycidyl ether, sorbitol tetraglycidyl ether, diglycidyl ether of tris-(2-hydroxyethyl) isocyanurate, and triglycidyl ether of tris-(2-hydroxyethyl)isocyanurate; alicyclic epoxy compounds such as isophoronediol diglycidyl ether, bis-2,2-hydroxycyclohexyl-propane diglycidyl ether; and aromatic epoxy compounds such as resorcin diglycidyl ether, bisphenol A diglycidyl ether, bisphenol F diglycidyl ether, bisphenol S diglycidyl ether, orthophthalic diglycidyl ester, phenol novolak polyglycidyl ether, and cresol novolak polyglycidyl ether.

The components included in the hard coat layer are not limited to the above. If necessary, any additive can be used in addition to the above-mentioned components when the hard coat layer is formed. An example of the additive is a curing catalyst. Examples of the curing catalyst can include perchloric acids such as perchloric acid, ammonium perchlorate, and magnesium perchlorate, acetylacetonate having Cu (II), Zn (II), Co (II), Ni (II), Be (II), Ce (III), Ta (III), Ti (III), Mn (III), La (III), Cr (III), V (III), Co (III), Fe (III), Al (III), Ce (IV), Zr (IV), V (IV) or the like as a central metal atom, amines, amino acids such as glycine, Lewis acids, and organic acid metal salts. Among these, examples of the most preferable curing catalyst include magnesium perchlorate, and acetylacetonate of Al (III) or Fe (III). The amount of the additive to be added is desirably in the range of 0.01 to 5.0% by weight in the solid content concentration.

Moreover, a solvent and the like may be used in addition to the above-mentioned components in the manufacturing process. Examples of the solvent that can be used for dilution include alcohols, esters, ketones, ethers, aromatic series and the like. Also, a small amount of a surfactant, an antistatic agent, a disperse dye, an oil soluble dye, a fluorescent dye, a pigment, a photochromic compound and the like may be added as needed to enable improvement in the coating properties of the coating liquid for forming the hard coat layer, and coated film performances following curing.

Another way to describe the invention is to say that it provides a colored lens manufacturing method that includes heating a coated lens in a first heating step; then dyeing the lens in a dyeing liquid; and then heating the lens in a second heating step. According to this aspect of the invention, the ratio of the heat provided over time in the first heating step, to the total amount of the heat provided over time in the first and second heating steps taken together, is not more than 0.5. Moreover, the ratio is greater than 0.2. In addition, the temperature in the first and second heating steps is between 100 and 150 degrees Celsius. The combined duration of the first and second heating steps is from 1 to 3 hours, inclusive. The dyeable hard coat layer of the coated lens may include fine metal-oxide particles, a silicon compound, and a polyfunctional epoxy compound as main components.

BRIEF DESCRIPTION OF THE DRAWINGS

The invention will be described with reference to the accompanying drawings, wherein like numbers reference like elements.

FIG. 2 is a table showing manufacturing conditions of lenses in examples and comparative examples, dyeability, and test results for dyeing workability, yellow degree, uneven coloring, wear-resistance and close-adhesion.

FIG. 3 is a table showing evaluations for the lenses in the examples and the comparative examples.

DESCRIPTION OF EXEMPLARY EMBODIMENTS

Figure 1:
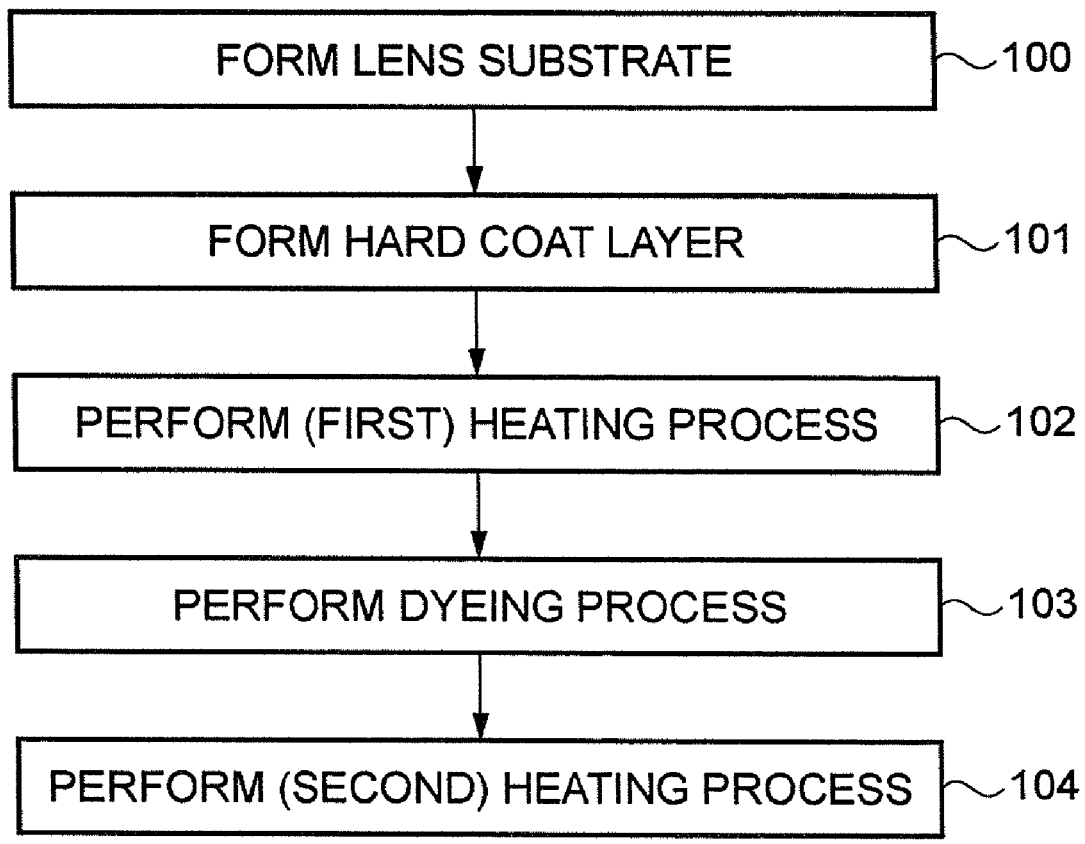
FIG. 1 is a flow chart showing a method of manufacturing a colored lens according to an aspect of the invention.

FIG. 1 shows an outline of the lens manufacturing steps according to an embodiment of the invention. Firstly, in Step 100, a plastic lens substrate having a refractive index of 1.67 was formed using a lens for "Seiko Super Sovereign", manufactured by Seiko Epson Corporation (hereinafter, abbreviated as SSV).

Next, in Step 101, a coating liquid for forming a dyeable hard coat layer was applied onto the lens substrate by a dipping method (coating step). The coating liquid was prepared as follows. A mixture of 103.2 g of butylcellosolve and 35.3 g of γ-glycidoxypropyl-trimethoxysilane was prepared. 9.7 g of 0.1N HCl solution was added to the mixture and stirred. After the stirring was performed for 3 hours, the mixture was aged for a whole day and night. To this liquid, 312.5 g of a titanium oxide-containing complex oxide sol dispersed in methanol (manufactured by CATALYSTS & CHEMICALS IND. CO., LTD., Trade name "Optolake 62" (solid matter concentration: 20% by weight)), 37.5 g of diglycerol polyglycidyl ether (manufactured by Nagase Chemicals, Ltd, Trade name "Denacol EX-421"), 1.7 g of magnesium perchlorate, 0.15 g of a silicon-based surfactant (manufactured by Nippon Unicar Company Limited, Trade name "L-7604"), and 0.6 g of a phenol-based antioxidant (manufactured by KAWAGUCHI CHEMICAL INDUSTRY CO., LTD., Trade name "Antage Crystal") were further added. The resulting mixture was stirred for 4 hours, and then aged for a whole day and night to obtain a coating liquid. The coating liquid thus obtained was applied onto the lens substrate by a dipping method (pull-up rate 20 cm/min).

In Step 102, the lens substrate coated with the coating liquid was heated at the temperature $T_1°$ C. for $t_1$ hours (first heating step). Next, in Step 103, a bath at 90° C. in which a dye was dispersed and an activator was mixed was prepared, and the lens substrate heated at the temperature $T_1°$ C. for $t_1$ hours was dipped in this bath for $t_3$ hours such that the luminous transmittance was controlled to 50%. As a result, the hard coat layer thereon was dyed (dyeing step). As the dye to be dispersed, for example, Amber D for Seiko Plux Diamond Coat can be used.

In Step 104, the lens substrate having the dyed hard coat layer was heated at the temperature $T_2°$ C. for $t_2$ hours (second heating step). Accordingly, the dyed hard coat layer having a thickness of 1.0 μm was formed on the lens substrate. The solid content ratio of the burned hard coat layer obtained by the coating liquid (after the second heating step), that is, metal oxide:silane compound:polyfunctional epoxy compound was about 50:20:30. Subsequently, on the hard coat layer, an antireflection layer may be formed. In addition, on the antireflection layer, an antifouling layer may be formed.

Hereinafter, samples were prepared by changing the temperature $T_1$ (° C.), time $t_1$ (hour), temperature $T_2$ (° C.), time $t_2$ (hour). The first management value Q1 (° C.·H) is the product of the temperature $T_1$ and the time $t_1$, the second management value Q2 (° C.·H) is the product of the temperature $T_2$ and the time $t_2$, and (Q1+Q2) (° C.·H) is the sum of the Q1 and Q2. The samples in which the ratio Q1/(Q1+Q2) satisfies the above-mentioned Expression 1 are exemplary samples, and the samples in which the ratio Q1/(Q1+Q2) does not satisfy the above-mentioned Expression 1 are comparative samples.

FIG. 2 shows manufacturing conditions of the exemplary lens samples and the comparative lens samples, dyeability, and test results for dyeing workability, yellow degree, uneven coloring, wear-resistance and close-adhesion. FIG. 3 shows evaluations for the exemplary lens samples and the comparative lens samples.

Example 1

As shown in FIG. 2, in example 1, the first heating step was performed at 125° C. (temperature $T_1$) for 0.50 hours (time $t_1$). Three minutes were required to control the luminous transmittance to 50% in the dyeing step. In addition, the second heating step was performed at 125° C. (temperature $T_2$) for 1.50 hours (time $t_2$).

As shown in FIG. 3, in Example 1, the management value Q1 (=$T_1 \times t_1$) corresponding to the amount of heat for the first heating step is 62.5 (rounded to one decimal place), the management value Q2 (=$T_2 \times t_2$) corresponding to the amount of heat for the second heating step is 187.5 (rounded to one decimal place), and (Q1+Q2) corresponding to the total amount of heat is 250.0 (rounded to one decimal place). The ratio Q1/(Q1+Q2) corresponding to heat distribution is 0.3 (rounded to one decimal place), and satisfies Expression 1. Total time (total lead time) $P_t$ ($t_1+t_2+t_3$) required for the heating and dyeing was 123 minutes.

Example 2

In example 2, the first heating step was performed at 125° C. (temperature $T_1$) for 0.50 hours (time $t_1$). Three minutes was required to control the luminous transmittance to 50% in the dyeing step. In addition, the second heating step was performed at 125° C. (temperature $T_2$) for 0.50 hours (time $t_2$).

In Example 2, the management value Q1 corresponding to the amount of heat for the first heating step is 62.5 (rounded to one decimal place), the management value Q2 corresponding to the amount of heat for the second heating step is 62.5 (rounded to one decimal place), and (Q1+Q2) corresponding to the total amount of heat is 125.0 (rounded to one decimal place). The ratio Q1/(Q1+Q2) corresponding to heat distribution is 0.5 (rounded to one decimal place), and satisfies Expression 1. Total lead time ($t_1+t_2+t_3$) was 63 minutes.

Example 3

In example 3, the first heating step was performed at 125° C. (temperature $T_1$) for 1.00 hour (time $t_1$). Six minutes were required to control the luminous transmittance to 50% in the dyeing step. In addition, the second heating step was performed at 125° C. (temperature $T_2$) for 1.00 hour (time $t_2$).

In Example 3, the management value Q1 corresponding to the amount of heat for the first heating step is 125.0 (rounded to one decimal place), the management value Q2 corresponding to the amount of heat for the second heating step is 125.0 (rounded to one decimal place), and (Q1+Q2) corresponding to the total amount of heat is 250.0 (rounded to one decimal place). The ratio Q1/(Q1+Q2) corresponding to heat distribution is 0.5 (rounded to one decimal place), and satisfies Expression 1. Total lead time ($t_1+t_2+t_3$) was 126 minutes.

Comparative Example 1

In comparative example 1, the first heating step was performed at 125° C. (temperature $T_1$) for 1.00 hour (time $t_1$). Six minutes were required to control the luminous transmittance to 50% in the dyeing step. In addition, the second heating step was performed at 80° C. (temperature $T_2$) for 0.50 hours (time $t_2$).

In Comparative Example 1, the management value Q1 corresponding to the amount of heat for the first heating step is 125.0 (rounded to one decimal place), the management value Q2 corresponding to the amount of heat for the second heating step is 40.0 (rounded to one decimal place), and (Q1+Q2) corresponding to the total amount of heat is 165.0 (rounded to one decimal place). The ratio Q1/(Q1+Q2) corresponding to heat distribution is 0.8 (rounded to one decimal place), and does not satisfy Expression 1. Total lead time ($t_1+t_2+t_3$) was 96 minutes.

Comparative Example 2

In comparative example 2, the first heating step was performed at 80° C. (temperature $T_1$) for 0.50 hours (time $t_1$). One minute was required to control the luminous transmittance to 50% in the dyeing step. In addition, the second heating step was performed at 125° C. (temperature $T_2$) for 1.50 hours (time $t_2$).

In Comparative Example 2, the management value Q1 corresponding to the amount of heat for the first heating step is 40.0 (rounded to one decimal place), the management value Q2 corresponding to the amount of heat for the second heating step is 187.5 (rounded to one decimal place), and (Q1+Q2) corresponding to the total amount of heat is 227.5 (rounded to one decimal place). The ratio Q1/(Q1+Q2) corresponding to heat distribution is 0.2 (rounded to one decimal place), and does not satisfy Expression 1. Total lead time $(t_1+t_2+t_3)$ was 121 minutes.

Comparative Example 3

In comparative example 3, the first heating step was performed at 125° C. (temperature $T_1$) for 0.25 hours (time $t_1$). One minute was required to control the luminous transmittance to 50% in the dyeing step. In addition, the second heating step was performed at 125° C. (temperature $T_2$) for 1.75 hours (time $t_2$).

In Comparative Example 3, the management value Q1 corresponding to the amount of heat for the first heating step is 31.3 (rounded to one decimal place), the management value Q2 corresponding to the amount of heat for the second heating step is 218.8 (rounded to one decimal place), and (Q1+Q2) corresponding to the total amount of heat is 250.0 (rounded to one decimal place). The ratio Q1/(Q1+Q2) corresponding to heat distribution is 0.1 (rounded to one decimal place), and does not satisfy Expression 1. Total lead time $(t_1+t_2+t_3)$ was 121 minutes.

Comparative Example 4

In comparative example 4, the first heating step was performed at 125° C. (temperature $T_1$) for 2.00 hours (time $t_1$). Ten minutes was required to control the luminous transmittance to 50% in the dyeing step. In addition, the second heating step was performed at 125° C. (temperature $T_2$) for 1.00 hours (time $t_2$).

In Comparative Example 4, the management value Q1 corresponding to the amount of heat for the first heating step is 250.0 (rounded to one decimal place), the management value Q2 corresponding to the amount of heat for the second heating step is 125.0 (rounded to one decimal place), and (Q1+Q2) corresponding to the total amount of heat is 375.0 (rounded to one decimal place). The ratio Q1/(Q1+Q2) corresponding to heat distribution is 0.7 (rounded to one decimal place), and does not satisfy Expression 1. Total lead time $(t_1+t_2+t_3)$ was 190 minutes.

Comparative Example 5

In comparative example 5, the first heating step was performed at 125° C. (temperature $T_1$) for 3.00 hours (time $t_1$). Twelve minutes was required to control the luminous transmittance to 50% in the dyeing step. In addition, the second heating step was performed at 125° C. (temperature $T_2$) for 1.00 hour (time $t_2$).

In Comparative Example 5, the management value Q1 corresponding to the amount of heat for the first heating step is 375.0 (rounded to one decimal place), the management value Q2 corresponding to the amount of heat for the second heating step is 125.0 (rounded to one decimal place), and (Q1+Q2) corresponding to the total amount of heat is 500.0 (rounded to one decimal place). The ratio Q1/(Q1+Q2) corresponding to heat distribution is 0.8 (rounded to one decimal place), and does not satisfy Expression 1. Total lead time $(t_1+t_2+t_3)$ was 252 minutes.

Comparative Example 6

In comparative example 6, the first heating step was performed at 125° C. (temperature $T_1$) for 6.00 hours (time $t_1$). Fifteen minutes was required to control the luminous transmittance to 50% in the dyeing step. In addition, the second heating step was performed at 125° C. (temperature $T_2$) for 1.00 hour (time $t_2$).

In Comparative Example 6, the management value Q1 corresponding to the amount of heat for the first heating step is 750.0 (rounded to one decimal place), the management value Q2 corresponding to the amount of heat for the second heating step is 125.0 (rounded to one decimal place), and (Q1+Q2) corresponding to the total amount of heat is 875.0 (rounded to one decimal place) The ratio Q1/(Q1+Q2) corresponding to heat distribution is 0.9 (rounded to one decimal place), and does not satisfy Expression 1. Total lead time $(t_1+t_2+t_3)$ was 435 minutes.

Comparative Example 7

In comparative example 7, the first heating step was performed at 150° C. (temperature $T_1$) for 0.25 hours (time $t_1$). Three minutes was required to control the luminous transmittance to 50% in the dyeing step. In addition, the second heating step was performed at 125° C. (temperature $T_2$) for 2.00 hours (time $t_2$).

In Comparative Example 7, the management value Q1 corresponding to the amount of heat for the first heating step is 37.5 (rounded to one decimal place), the management value Q2 corresponding to the amount of heat for the second heating step is 250.0 (rounded to one decimal place), and (Q1+Q2) corresponding to the total amount of heat is 287.5 (rounded to one decimal place). The ratio Q1/(Q1+Q2) corresponding to heat distribution is 0.1 (rounded to one decimal place), and does not satisfy Expression 1. Total lead time $(t_1+t_2+t_3)$ was 138 minutes.

Comparative Example 8

In comparative example 8, the first heating step was performed at 125° C. (temperature $T_1$) for 2.00 hours (time $t_1$). Ten minutes was required to control the luminous transmittance to 50% in the dyeing step. In addition, the second heating step was performed at 120° C. (temperature $T_2$) for 1.00 hour (time $t_2$).

In Comparative Example 8, the management value Q1 corresponding to the amount of heat for the first heating step is 250.0 (rounded to one decimal place), the management value Q2 corresponding to the amount of heat for the second heating step is 120.0 (rounded to one decimal place), and (Q1+Q2) corresponding to the total amount of heat is 370.0 (rounded to one decimal place). The ratio Q1/(Q1+Q2) corresponding to heat distribution is 0.7 (rounded to one decimal place), and does not satisfy Expression 1. Total lead time $(t_1+t_2+t_3)$ was 190 minutes.

Comparative Example 9

In comparative example 9, the first heating step was performed at 125° C. (temperature $T_1$) for 0.25 hours (time $t_1$). One minute was required to control the luminous transmittance to 50% in the dyeing step. In addition, the second heating step was performed at 150° C. (temperature $T_2$) for 2.00 hours (time $t_2$).

In Comparative Example 9, the management value Q1 corresponding to the amount of heat for the first heating step is 31.3 (rounded to one decimal place), the management value Q2 corresponding to the amount of heat for the second heating step is 300.0 (rounded to one decimal place), and (Q1+Q2) corresponding to the total amount of heat is 331.3 (rounded to one decimal place). The ratio Q1/(Q1+Q2) corresponding to heat distribution is 0.1 (rounded to one decimal place), and does not satisfy Expression 1. Total lead time $(t_1+t_2+t_3)$ was 138 minutes.

Comparative Example 10

In comparative example 10, the first heating step was performed at 125° C. (temperature $T_1$) for 0.25 hours (time $t_1$). Six minutes were required to control the luminous transmittance to 50% in the dyeing step. In addition, the second heating step was performed at 80° C. (temperature $T_2$) for 0.25 hours (time $t_2$).

In Comparative Example 10, the management value Q1 corresponding to the amount of heat for the first heating step is 31.3 (rounded to one decimal place), the management value Q2 corresponding to the amount of heat for the second heating step is 20.0 (rounded to one decimal place), and (Q1+Q2) corresponding to the total amount of heat is 51.3 (rounded to one decimal place). The ratio Q1/(Q1+Q2) corresponding to heat distribution is 0.6 (rounded to one decimal place), and does not satisfy Expression 1. Total lead time $(t_1+t_2+t_3)$ was 36 minutes.

Evaluation Methods and Evaluation Criteria

Tests for the dyeing workability, yellow degree, uneven coloring, wear-resistance and close-adhesion were performed on the colored lens samples obtained by the manufacturing methods described in Examples 1 to 3 and Comparative Examples 1 to 10. The results of the tests are described in FIG. 2.

To determine the dyeing workability, it was checked whether a hard coat layer was peeled off from a lens surface when a dye present on the lens surface subjected to dyeing was wiped by a fabric wetted with acetone. As the evaluation criteria for the dyeing workability, "◯" means that the peeling does not occur, "X" means that the peeling occurs.

The yellow degree was checked by the naked eye. As the evaluation criteria for the yellow degree, "◯" means that the discoloration to yellow does not occur, "Δ" means that a very small discoloration to yellow occurs, and "X" means that the discoloration to yellow is confirmed by the naked eye.

To determine the uneven coloring, transmitted light and reflected light of a fluorescent lamp were used in a dark box having a black background. The distortion of the lens surface subjected to the second heating step was checked by the naked eye. As the evaluation criteria for the uneven coloring, "◯" means that the distortion does not occur, and "X" means that the distortion exists.

To determine the wear-resistance, a load of 1 kg was applied to the surface of the colored lens and the surface was reciprocatingly rubbed 10 times with "Bonstar #0000 steel wool" (manufactured by Nihon Steel Wool Co., Ltd). Then, the degree of scratching was checked by the naked eye. The evaluation criteria for the wear-resistance include 10 scratch levels (1 (bad) to 10 (good)) that are decided by checking the degree of scratching with the naked eye. "⊚" means that the level is in the range of 10 to 8 and the wear-resistance is very high, "◯" means that the level is in the range of 7 to 6 and the wear-resistance is high, "Δ" means that the level is in the range of 5 to 4 and the wear-resistance is slightly low, and "X" means that the level is in the range of 3 to 1 and the wear-resistance is low.

The close-adhesion was tested by leaving the lens samples in three different conditions. For the sunshine test for close-adhesion, the lens samples were exposed to arc light in which carbon atoms are electrically discharged for 120 hours (corresponding to the exposure for 120 hours under the sun). Then, a cross-cut tape test was performed according to JISD-0202. To determine the close-adhesion of the lens samples left in the constant-temperature and humidity, the lens samples were left for 7 days under the conditions of a temperature of 60° C. and a relative humidity (RH) of 99%. Next, the cross-cut tape test was performed to the lens samples according to JISD-0202. To determine the close-adhesion of the lens samples left in hot water, the lens samples were left in the hot water at 90° C. for 1.5 hours. Next, the cross-cut tape test was performed to the lens samples according to JISD-0202.

In the cross-cut tape test, cuts were formed on the lens surface at intervals of 1 mm by means of knife, thereby forming 100 pieces of 1 $mm^2$ square. To them, a cellophane adhesive tape (manufactured by Nichiban Co., Ltd, Trade name "Cellotape" (registered trademark)) was strongly pressed and attached, and then instantly peeled off at an angle of 90 degrees from the surface. The number of the squares remaining on the coated layer (film) of the lens was used as an index for close-adhesion and checked by the naked eye. 8 levels (1 (bad) to 8 (good)) are decided by checking the close-adhesion with the naked eye. "8" means that the coat film area is 100% and the close-adhesion is very high, "7" means that the coat film area is equal to 99% and less than 100%, "6" means that the coat film area is equal to 95% and less than 99%, "5" means that the coat film area is equal to 85% and less than 95%, "4" means that the coat film area is equal to 65% and less than 85%, "3" means that the coat film area is equal to 35% and less than 65%. "2" means that the coat film area is equal to 15% and less than 35%, and "1" means that the coat film area is equal to 0% and less than 15%.

Evaluation Results

In Examples 1 to 3, the ratio Q1/(Q1+Q2), the temperature $T_1$, the temperature $T_2$, and the total time $P_t$ satisfy the above-mentioned Expressions 1 to 4. All of the colored lenses manufactured in accordance with Examples 1 to 3 are excellent in the dyeing workability, evenness of coloring, wear-resistance and close-adhesion. Also, the above colored lenses are not yellowed.

The colored lenses manufactured in accordance with Examples 1 to 3 are excellent in the dyeing workability, uneven coloring, wear-resistance and close-adhesion, and are not yellowed. In addition, when the dyeability (dyeing time) $t_3$ of the colored lenses is checked, it can be readily seen that the dyeing time is short and the dyeing speed is fast in comparison with Comparative Examples 4 to 8. Further, the total time $P_t$ is shorter than those of the colored lenses manufactured in accordance with Comparative Examples 4 to 8. That is, a colored lens having excellent properties can be manufactured in a short period of time.

In Comparative Example 1, the ratio $Q1/(Q1+Q2)$ is 0.8, and does not satisfy the above-mentioned Expression 1. Further, the temperature $T_2$ for the second heating step is 80° C., and does not satisfy the above-mentioned Expression 3. In the colored lens manufactured in accordance with Comparative Example 1, distortion remains on the lens surface subjected to the second heating step. The reason for this is that the amount of heat for the second heating step is too small because the ratio $Q1/(Q1+Q2)$ is larger than 0.5 and the temperature $T_2$ for the second heating step is too low. Since the colored lens manufactured in accordance with Comparative Example 1 has unrecovered unevenness on the lens surface thereof, the wear-resistance and close-adhesion can not be accurately evaluated.

In Comparative Example 2, the ratio $Q1/(Q1+Q2)$ corresponding to the heat distribution is 0.2, and does not satisfy the above-mentioned Expression 1. Further, the temperature $T_1$ for the first heating step is 80° C., and does not satisfy the above-mentioned Expression 2. In the colored lens manufactured in accordance with Comparative Example 2, the hard coat layer is peeled off when the test for dyeing workability is performed. The reason for this is that the amount of heat for the first heating step is too small because the ratio $Q1/(Q1+Q2)$ is 0.2 or less and the temperature $T_1$ for the first heating step is too low. Since the hard coat layer is peeled off from the colored lens manufactured in accordance with Comparative Example 2 at the time of performing the test for dyeing workability, the wear-resistance and close-adhesion can not be accurately evaluated.

In Comparative Example 3, the ratio $Q1/(Q1+Q2)$ corresponding to the heat distribution is 0.1, and does not satisfy the above-mentioned Expression 1. In the colored lens manufactured in accordance with Comparative Example 3, the hard coat layer is peeled off when the test for dyeing workability is performed. The reason for this is that the ratio $Q1/(Q1+Q2)$ is less than 0.2 and the amount of heat for the first heating step is small. Since the hard coat layer is peeled off from the colored lens manufactured in accordance with Comparative Example 3 at the time of performing the test for the dyeing workability, the wear-resistance and close-adhesion can not be accurately evaluated.

In Comparative Example 4, the ratio $Q1/(Q1+Q2)$ corresponding to the heat distribution is 0.7, and does not satisfy the above-mentioned Expression 1. The colored lens manufactured in accordance with Comparative Example 4 is excellent in the dyeing workability, uneven coloring, wear-resistance, and close-adhesion, and is not yellowed. However, the total time is long in comparison with Examples 1 to 3. That is, it takes a long time for manufacturing.

In Comparative Example 5, the ratio $Q1/(Q1+Q2)$ corresponding to the heat distribution is 0.8, and does not satisfy the above-mentioned Expression 1. Further, the total heating time $(t_1+t_2)$ of the first heating time $t_1$ and the second heating time $t_2$ is 4 hours, and does not satisfy the above-mentioned Expression 4. The colored lens manufactured in accordance with Comparative Example 5 is slightly yellowed. The reason for this is that the ratio $Q1/(Q1+Q2)$ corresponding to the heat distribution is larger than 0.5 and the total heating time $(t_1+t_2)$ is long.

In Comparative Example 6, the ratio $Q1/(Q1+Q2)$ corresponding to the heat distribution is 0.9, and does not satisfy the above-mentioned Expression 1. Further, the total heating time $(t_1+t_2)$ of the first heating time $t_1$ and the second heating time $t_2$ is 7 hours, and does not satisfy the above-mentioned Expression 4. In the colored lens manufactured in accordance with Comparative Example 6, the discoloration to yellow is confirmed by the naked eye. The reason for this is that the ratio $Q1/(Q1+Q2)$ corresponding to the heat distribution is larger than 0.5 and the total heating time $(t_1+t_2)$ is too long. In addition, since the discoloration to yellow is confirmed by the naked eye in the colored lens manufactured in accordance with Comparative Example 6, the wear-resistance and close-adhesion can not be accurately evaluated.

In Comparative Example 7, the ratio $Q1/(Q1+Q2)$ corresponding to the heat distribution is 0.1, and does not satisfy the above-mentioned Expression 1. Further, the temperature $T_1$ for the first heating step is 150° C., and does not satisfy the above-mentioned Expression 2. In the colored lens manufactured in accordance with Comparative Example 7, the discoloration to yellow is confirmed by the naked eye. The reason for this is that the temperature $T_1$ for the first heating step is too high. In addition, since the discoloration to yellow is confirmed by the naked eye in the colored lens manufactured in accordance with Comparative Example 7, the wear-resistance and close-adhesion can not be accurately evaluated.

In Comparative Example 8, the ratio $Q1/(Q1+Q2)$ corresponding to the heat distribution is 0.7, and does not satisfy the above-mentioned Expression 1. The colored lens manufactured in accordance with Comparative Example 8 is excellent in the dyeing workability, uneven coloring, wear-resistance, and close-adhesion, and is not yellowed. However, the total time is long in comparison with Examples 1 to 3. That is, it takes a long time for manufacturing.

In Comparative Example 9, the ratio $Q1/(Q1+Q2)$ corresponding to the heat distribution is 0.1, and does not satisfy the above-mentioned Expression 1. Further, the temperature $T_2$ for the second heating step is 150° C., and does not satisfy the above-mentioned Expression 3. In the colored lens manufactured in accordance with Comparative Example 9, the discoloration to yellow is confirmed by the naked eye. The reason for this is that the amount of heat for the second heating step is too large because the ratio $Q1/(Q1+Q2)$ is below 0.2 and the temperature $T_2$ for the second heating step is too high. Since the discoloration to yellow is confirmed by the naked eye in the colored lens manufactured in accordance with Comparative Example 9, the wear-resistance and close-adhesion can not be accurately evaluated.

In Comparative Example 10, the ratio $Q1/(Q1+Q2)$ corresponding to the heat distribution is 0.6, and does not satisfy the above-mentioned Expression 1. Further, the temperature $T_2$ for the second heating step is 80° C., and does not satisfy the above-mentioned Expression 3. In the colored lens manufactured in accordance with Comparative Example 10, the hard coat layer is peeled off when the test for dyeing workability is performed, and distortion remains on the lens surface subjected to the second heating step. The reason for this is that the amount of heat Q2 for the second heating step is too small because the ratio $Q1/(Q1+Q2)$ is larger than 0.5 and the temperature $T_2$ for the second heating step is too low. Since the hard coat layer is peeled off from the colored lens manufactured in accordance with Comparative Example 10 at the time of performing the test for dyeing workability and the unevenness remaining on the lens surface is not recovered, the wear-resistance and close-adhesion can not be accurately evaluated.

A plastic lens is exemplified as a substrate in the examples. However, a glass lens may be used as the substrate. Further, in this application, a plastic lens used for glasses is manufactured as a colored lens, and durability such as close-adhesion and wear-resistance is evaluated in addition to dyeability. However, a dyed lens (optical element) applicable to the invention is not limited to a spectacle lens but may be a lens for a camera. The invention is applicable to other optical elements, for example, a prism.

What is claimed is:

1. A method, of manufacturing a colored lens, comprising:
   applying a coating liquid for forming a dyeable hard coat layer over a lens substrate to provide a coated substrate;
   firstly heating the coated substrate at a temperature of $T_1$° C. for $t_1$ hours to provide a heated lens substrate;
   dyeing the heated lens substrate by dipping it in a dyeing liquid after the first heating step to provide a dyed lens; and
   heating the dyed lens at a temperature of $T_2$° C. for $t_2$ hours;
   wherein the following expression is satisfied when the product of the temperature $T_1$ and the time $t_1$ is a first management value Q1 and the product of the temperature $T_2$ and the time $t_2$ is a second management value Q2:

$0.2 < Q1/(Q1+Q2) \leq 0.5$;

wherein the sum of the time $t_1$ and the time $t_2$ satisfies the following requirement:

1 hour$\leq (t_1+t_2) \leq$3 hours.

2. The method of manufacturing a colored lens according to claim 1, wherein the temperature $T_1$ and the temperature $T_2$ satisfy the following requirements:

100° C.$<T_1<$150° C.; and

100° C.$<T_2<$150° C.

3. The method of manufacturing a colored lens according to claim 1, wherein the dyeable hard coat layer includes fine metal-oxide particles, a silicon compound, and a polyfunctional epoxy compound as main components.

4. A colored lens manufacturing method, comprising:
   heating a coated lens in a first heating step; then
   dyeing the lens in a dyeing liquid; and then
   heating the lens in a second heating step;
   wherein the ratio of the heat provided over time in the first heating step, to the total amount of the heat provided over time in the first and second heating steps taken together, is not more than 0.5;
   wherein the combined duration of the first and second heating steps is from 1 to 3 hours, inclusive.

5. The colored lens manufacturing method as set forth in claim 4, wherein the ratio is greater than 0.2.

6. The colored lens manufacturing method as set forth in claim 5, wherein the temperature in the first and second heating steps is between 100 and 150 degrees Celsius.

7. The colored lens manufacturing method as set forth in claim 6, wherein a dyeable hard coat layer of the coated lens includes fine metal-oxide particles, a silicon compound, and a polyfunctional epoxy compound as main components.

* * * * *